United States Patent [19]

Blachetta et al.

[11] Patent Number: 5,577,292
[45] Date of Patent: Nov. 26, 1996

[54] WINDSCREEN WIPER WITH PRESSURE ADJUSTING MEANS

[75] Inventors: Thomas Blachetta, Heilbronn-Bockingen; Bruno Egner-Walter, Heilbronn; Klaus Jaisle, Leingarten, all of Germany

[73] Assignee: ITT Automotive Europe GmbH, Germany

[21] Appl. No.: 406,912

[22] PCT Filed: Sep. 20, 1993

[86] PCT No.: PCT/EP93/02547

§ 371 Date: Jul. 7, 1995

§ 102(e) Date: Jul. 7, 1995

[87] PCT Pub. No.: WO94/07712

PCT Pub. Date: Apr. 14, 1994

[30] Foreign Application Priority Data

Sep. 26, 1992 [DE] Germany .................. 42 32 333.9

[51] Int. Cl.⁶ .................... B60S 1/32; B60S 1/34
[52] U.S. Cl. .................... 15/250.202; 15/250.34; 15/250.351
[58] Field of Search .......... 15/250.202, 250.203, 15/250.351, 250.352, 250.19, 250.34

[56] References Cited

U.S. PATENT DOCUMENTS 2,844,839  7/1958  Krohm ................. 15/250.202
4,698,872 10/1987  Watanabe ............. 15/250.203
4,777,695 10/1988  Okuda et al. ......... 15/250.203
5,056,182 10/1991  Fukumoto et al. ..... 15/250.202
5,129,123  7/1992  Shirato .............. 15/250.203
5,253,388 10/1993  Bacronnier .......... 15/250.203
5,309,599  5/1994  Leutsch et al. ...... 15/250.203
5,426,815  6/1995  DaDeppo et al. ...... 15/250.202

FOREIGN PATENT DOCUMENTS 2928757  2/1981  Germany ............. 15/250.202
3643733  6/1988  Germany ............. 15/250.203
4028494  4/1991  Germany .
4033201  4/1992  Germany ............. 15/250.202
2081750  3/1990  Japan ............... 15/250.202
3176253  7/1991  Japan ............... 15/250.202
 000320  1/1994  WIPO ............... 15/250.351

Primary Examiner—Gary K. Graham
Attorney, Agent, or Firm—J. Gordon Lewis; Thomas N. Twomey

[57] ABSTRACT

A windscreen wiper system having a mounting portion and a wiper arm as well as a wiper arm spring, the contact pressure of the wiper blade exerted on the windscreen is adjusted in that the line of operation of the wiper arm spring is varied through a sliding insert. Moreover, the wiper arm spring is supported by a support lever on the mounting portion.

6 Claims, 5 Drawing Sheets

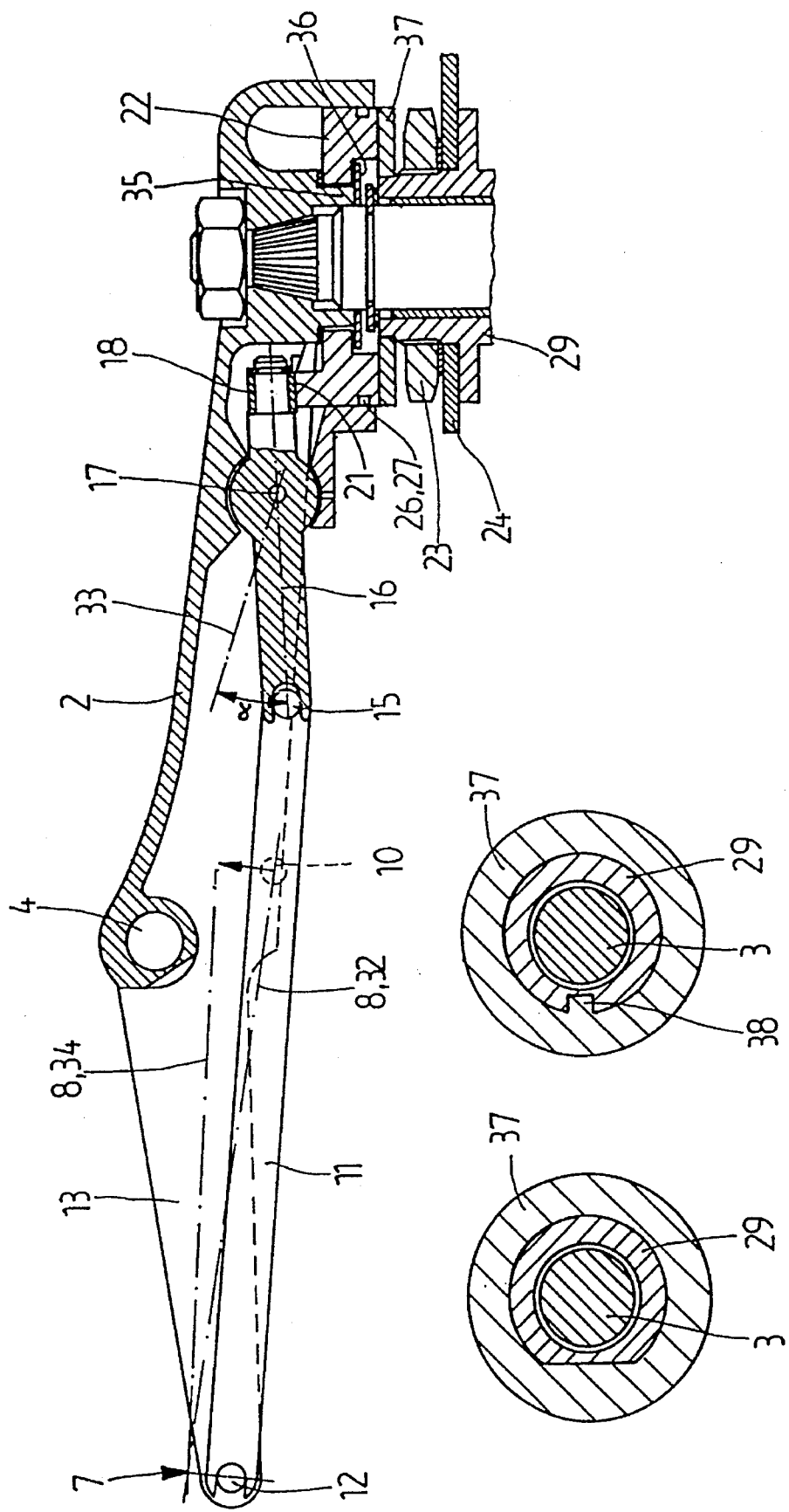

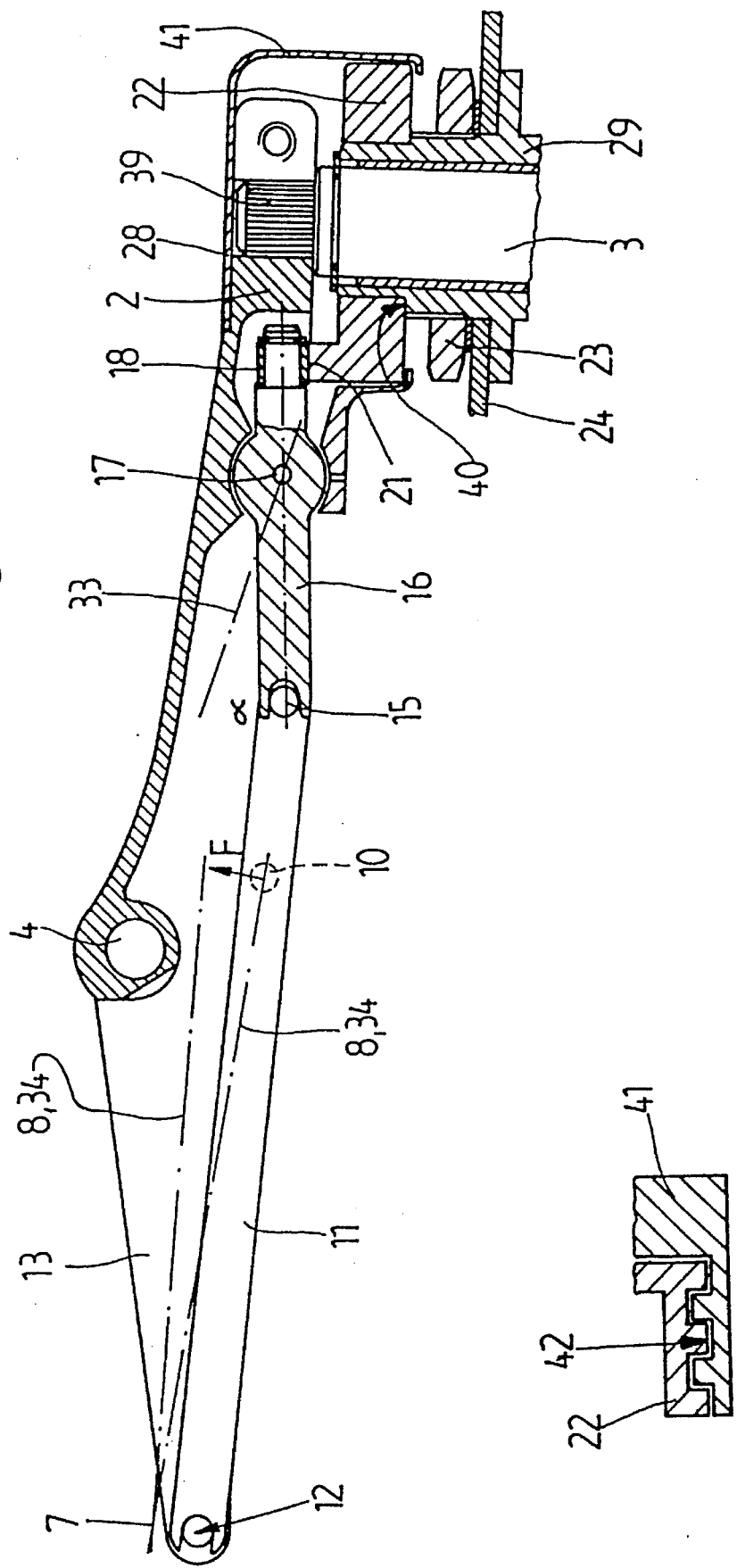

WINDSCREEN WIPER WITH PRESSURE ADJUSTING MEANS

TECHNICAL FIELD

The present invention relates to windscreen wiper systems, and in particular wiper systems that employ a means for forcing the wiper blade on the windscreen wherein the forcing means is variable through an adjusting mechanism.

BACKGROUND OF THE INVENTION

It is known in the art that especially at high vehicle speeds the slip stream strikes the windscreen of the vehicle so forcefully that, during bleed-off, an upward pressure is generated on the wiper blades and on the wiper arms moving across the windscreen, thereby reducing the contact between the windscreen and the wiper blade to such a degree that the cleaning effect of the entire system is markedly decreased. However, in particular, at high speeds perfect cleaning of the windscreen is required in order not to jeopardize the safety of the car passengers.

In the prior art designs according to DE-OS 28 24 014 and DE-PS 40 32 762 the contact force of the wiper arm is variable through a plunger means in that a movable plunger centrally passes through the wiper shaft to swivel an adjusting lever on which is fixed the end of the wiper arm spring facing the shaft in such a way that the line of operation of the spring is varied relative to the axis of the wiper arm, thereby varying the contact force exerted by the wiper arm on the windscreen. However, such arrangements involve the disadvantage that they are complex in design, providing hardly any protection against the ingress of dirt and moisture. Moreover, in view of the adjusting mechanism, the whole system is not sleek which effects not only the outward appearance but also the coefficient of the aerodynamic drag, thereby enhancing the danger of accident.

DE-OS 40 28 494 discloses another adjusting mechanism for windscreen wiper systems of the afore-described type wherein the line of operation of the wiper arm spring is also adjusted relative to the axis of the wiper arm. In that system, the end of the wiper arm spring facing the shaft side is hooked on an adjusting lever, with the latter moving across a sliding insert. The end of the wiper arm spring facing the shaft side is moved toward and away from the windscreen, respectively. A system of this type involves the advantage that it is of a relatively simple design and a low height of construction. However, it has been found to be disadvantageous that when adjusting the line of operation of the wiper arm spring it will be necessary to act against the force of the wiper arm spring involving additional load on the drive of the windscreen wiper system. Moreover, it will be necessary for the swivel bearing of the set lever to take up all of the tension force of the wiper arm spring. As it is especially the adjusting force for the wiper arm spring that is permanently changed, no uniform run (or consistent rate of movement) of the drive of the windscreen wiper system will be possible.

It is, therefore, the object of the invention to improve a windscreen wiper of the afore-mentioned type so as to insure a uniform run and a reduced load on the drive by the forces of the wiper arm spring.

This problem, in the practice of the invention, is solved in that the set element engages a support lever to which is fixed the end of the wiper arm spring facing the shaft side and which, with the end thereof facing away from the wiper shaft, is swivably journalled within a bearing on the mounting portion.

In the arrangement according to the invention, the wiper arm spring, on the one hand, is hooked on the wiper arm and, on the other hand, on the support lever which, in turn, is supported on the mounting portions, so that the whole of the tensile force of the wiper arm spring, in a simple way, is taken up and, through the support lever, is supported on the mounting portion. The adjusting lever of the set element engaging the support lever, hence, no longer is required to take up the tensile force of the wiper are spring, thereby allowing the bearing of the set lever to be designed in an essentially simpler and less rugged way thus enhancing the sensitivity and accuracy of the whole of the adjusting movement. As the support is provided by the support lever, it will also be possible to mount stronger wiper arm springs with no detrimental effect on sensitive bearings of the adjusting mechanism. In the arrangement according to the invention, the contact force is adjusted in that the line of operation of the wiper arm spring relative to the axis of the wiper am is adjusted in that the set lever engages the support lever, swivelling the same about the end thereof facing away from the wiper shaft and fixed, within a bearing, to the mounting portion. As the end of the wiper arm spring facing the shaft side is hooked on the support lever, the said end is also swivelled. The swivel movement is effected with minimal forces as it is not the spring as such but rather the support lever that is swivelled.

The advantage involved herewith resides in that the contact force forcing the wiper blade to the windscreen can be dimensioned to precisely correspond to the position of the wiper blade on the windscreen. Hence, a low contact force can prevail, for example, in the two reversal points of the wiper blade so that the wiping rubber when passing from one wiping position into another is not unnecessarily loaded, thereby also relieving the drive. Moreover, the wiper blade, in its resting position, can be almost completely unloaded thus being exposed to lower deforming forces, thereby enhancing its operating life.

According to an advantageous embodiment of the invention the swivel bearing of the support lever is provided in the vicinity of the hook-on point of the wiper arm spring on the wiper arm so that the forces required for the adjusting movement of the support lever, preferably, can be reduced since in view of the direct vicinity of the swivel bearing of the support lever and the hook-on point of the wiper arm spring only low forces orthogonal to the longitudinal direction of the spring will occur.

An adjustment performed with no force applied can be attained in that the swivel bearing of the support lever on the mounting portion and the hook-on point of the wiper arm spring on the wiper arm coincide. In this way, all of the forces originating from the wiper arm spring are taken up by the support lever. The adjusting movement of the set lever varying the line operation of the wiper arm spring relative to the axis of the wiper arm, will only require bearing and friction forces to be overcome. This giving rise to the advantage that the drive of the windscreen wiper arrangement is not exposed to any additional load.

A high operation safety and minor structural measures for guiding the set lever on the sliding insert are achieved in that the swivel bearing of the support lever relative to the hook-on point of the wiper arm spring on the wiper arm is at a small directional distance so that the set lever of the adjusting mechanism is permanently forced against the sliding insert, thereby insuring that the block of the sliding insert of the set lever safely sweeps across the cam of the sliding insert. In this respect, the force of abutment of the set lever relative to the sliding insert can be so selected that the set lever even in high wiping speeds is not lifted from the sliding insert.

A reduced set force is attained in that the hook-on point of the end of the wiper arm spring facing the shaft is fixed at a distance from the end of the support lever facing the shaft side, thereby attaining a favorable lever arm so that the forces between sliding insert and set lever can be further reduced. Due to different support levers with differently arranged hook-on points, the contact force of the wiper blade of the windscreen wiper system, in a simple way, can be varied and adapted in a way specific to the vehicle.

Preferably, the support lever is configured as a dual-leg lever between which the wiper arm spring is arranged. This configuration provides a high degree of safety during the take-up of the spring forces; for increasing the rigidity of the lever it can be of a U-type profile.

The support lever can easily hook on the mounting portion in that the swivel bearing of the support lever is of a fork-type configuration. The support lever is safely held within the bearing through the force of the wiper arm spring.

Advantageously, the wiper arm together with the mounting portion and the sliding insert are designed as an integral unit which involves the advantage that the whole of the arrangement can be easily mounted on the wiper shaft. Moreover, conventional screen wiper arrangements, in a simple way, can be subsequently equipped with the system of the invention.

To protect the adjusting mechanism against the ingress of dirt and moisture, the sliding insert, through an O-ring gasket and/or labyrinth-type pack, is located in the mounting portion through which, advantageously, wear is minimized.

A proper positioning of the sliding insert relative to the position of the mounting portion and of the wiper arm, respectively, is achieved in that the sliding insert is connected to the bearing of the wiper shaft through a feather, a dihedron or the like. This arrangement eliminates the need to subsequently adjust or align the sliding insert after mounting the fixing portion on the shaft; moreover, through the interaction of the sliding insert and the wiper shaft, the precise actuation of the wiper arm spring and the adjustment thereof, respectively, in response to the position of the wiper blade on the screen is safeguarded.

Further advantages, features and details of the invention will become manifest from the following description in which special forms of embodiment are described in detail with reference to the drawings.

BRIEF DESCRIPTION OF THE DRAWINGS

FIG. 2 illustrates the principle of arrangement of the two levers in the mounting portion with a first form of embodiment of a gasket of the sliding insert.

FIG. 3 is a corresponding view according to FIG. 2 with a second embodiment of the gasket of the sliding insert.

DETAILED DESCRIPTION OF THE PREFERRED EMBODIMENTS

Figure 1:
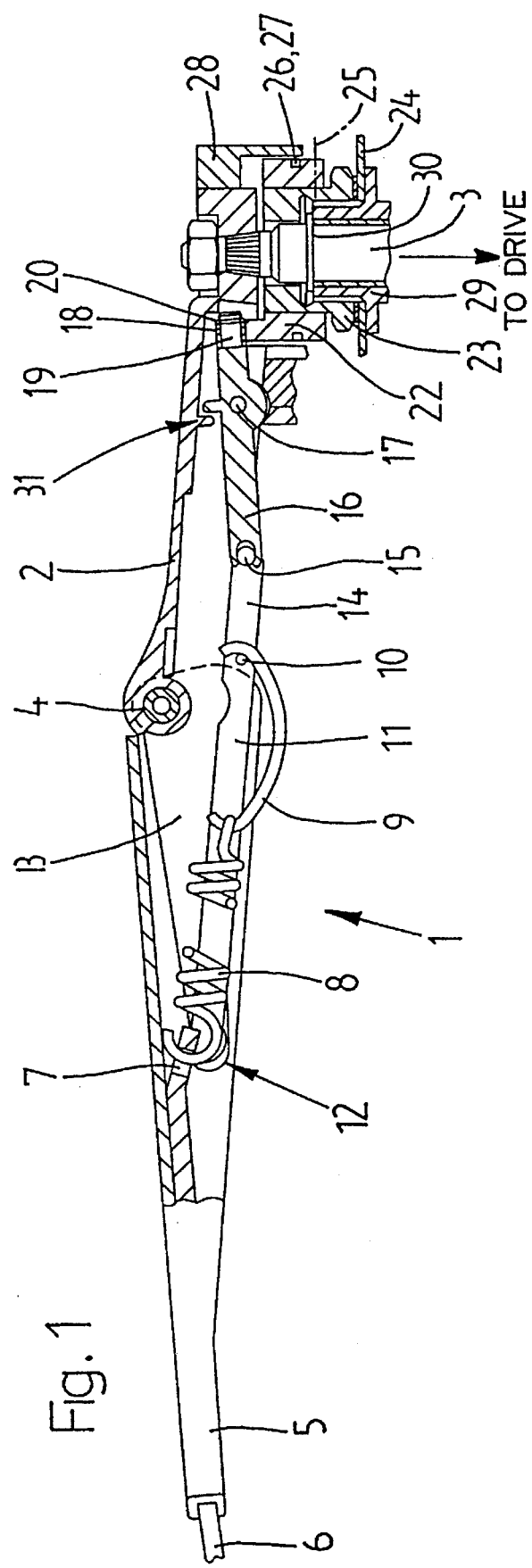
FIG. 1 shows a partial longitudinal cross section through a wiper arm including a mounting portion secured to a wiper shaft.
Figure 8:
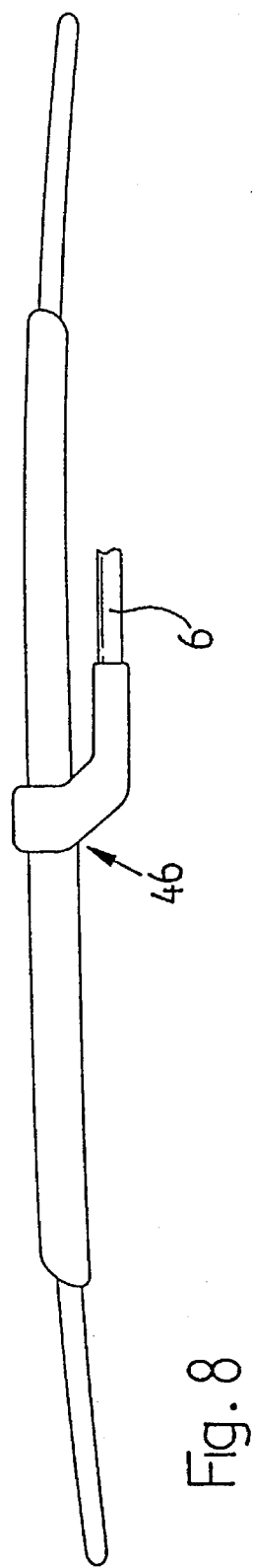
FIG. 8 shows a wiper blade attached to a wiper rod.

Referring to FIG. 1 and FIG. 8, FIG. 1 shows a first embodiment of the screen wiper system of the present invention generally designated by reference numeral 1 in which a mounting portion 2 is fixed, in a conventional way, to a wiper shaft 3. A wiper arm 5 is swivably fixed, through a swivel joint 4, to the mounting portion 2. The wiper arm 5 is provided with a wiper rod 6 to the free end of which a wiper blade 46 can be fixed. The other end of the wiper rod 6 is provided with a mounting aperture 7 for a wiper arm spring 8 which, through a bracket 9, is hooked on a bearing 10 of a support lever 11. The support lever 11, in turn, is supported on a swivel bearing 12 of an extension 13 of the mounting portion 2. Provided on the end 14 facing the shaft is another bearing 15 for slidably and pivotally supporting a set lever 16 which, in turn, through a swivel bearing 17, is swivably disposed in the mounting portion 2.

The end of the set lever 16 facing the shaft side is provided with a roller bearing 18 pushed on a pin 19 in axial relationship to the set lever 16 and locked against slippage by a safety ring 20. The roller bearing 18 rotates on a cam 21 (FIGS. 5 and 6) of a sliding insert 22 arranged in coaxial relationship to the wiper shaft 3, with the cam 21 of the sliding insert 22 extending in the axial direction relative to the sliding insert 22. The sliding insert 22 is pushed onto the mounting nut 23 fixing the entire screen wiper system 1, for example, to a metal sheet 24 of the car body. A nut 25 shown in greater detail in FIG. 6 serves as a lock against rotation. The sliding insert 22, in addition, is provided with a peripheral groove 26 into which is inserted an O-ring 27 serving as a gasket. The sliding insert is covered by a cap 28 spreading, in an apron-type way, over the O-ring 27. The cover cap 28 prevents the ingress of moisture and dirt in the area of the sliding insert 22 and the cam 21 thereof, respectively. The ingress of moisture and dirt into the wiper bearing 29 of the wiper shaft 3 is precluded by a packing box 30. Moreover, another pack 31 configured as a labyrinth-type seal is provided between the inner side of the mounting portion 2 and the upper side of the set lever 16.

FIG. 2 schematically shows the mounting portion 2 along with the support lever 11 and the set lever 16, with the wiper arm spring 8 being merely shown as a line 32. FIG. 2 clearly conveys that the mounting aperture 7 in which is hooked the wiper arm spring 8, is located slightly above the swivel bearing 12 of the support lever 11. For this reason, a force F is applied to the support lever 11 through the force of the wiper arm spring 8 in clockwise direction about the swivel bearing 12. Thanks to the force F, force is applied to the set lever 16 in clockwise direction such that the roller bearing 18 is in permanent abutment with the cam 21 of the sliding insert 22. The force of abutment can be determined by the distance of the mounting aperture 7 from the swivel bearing 12 of the support lever 11. A borderline case is attained if the mounting aperture 7 coincides with the swivel bearing 12. However, in that case the roller bearing 18 will require a force guidance as it will then be in abutment with cam 21 with no force applied.

The maximum contact force will be achieved in the position of the set lever 16 as shown in FIG. 2. If the roller bearing 18 sweeps across the cam 21, the set lever 16, by swivelling about the angle α, it reaches a position designated by line 33 which constitutes an extreme position for the minimum contact force. The spring 8 then takes a position as indicated by line 34, it being clearly conveyed that the force F does not change (because the distance of the mounting aperture 7 from the swivel bearing 12 does not vary). The contact force adjustment can, therefore, be performed without applying any additional force. Because the force required for the adjustment does not varying, it precludes any fluctuations in the synchronism of the drive.

In the example of embodiment as shown in FIG. 2 the mounting portion 2 with the wiper arm hinged thereto as well as the two levers 11 and 16 and the sliding insert 22 are formed as an integral unit. The sliding insert 22 is pushed onto an axial extension 35 of the mounting portion 2 and is locked through a plate 36. Secured to the bottom end of the sliding insert 22 facing the front side is another plate 37 truncated on one side or provided with an axial feather 38 (see FIGS. 2a and 2b, respectively). The wiper bearing is provided with a truncation and an axial groove, respectively, conforming to the truncation and the feather 38, respectively, so that the plate 37 and, hence, the sliding insert 22 can be inserted in a single defined position. The cam 21 of the sliding insert 22 is thereby in alignment with the screen wiper system 1 and the windscreen. No subsequent alignment or adjustment and arresting steps through special arresting nuts will in that case be required.

In the form of embodiment as shown in FIG. 3 the wiper shaft 3 is provided with a cylindrical hurling 39 on which is mounted and arrested the mounting portion 2 to which is imparted a defined position through the hurling 39 on which it is pushed against a stop. The wiper bearing 29 also includes a stop 40 on which is pushed the sliding insert 22. Moreover, the wiper bearing 29 is provided with a dihedron and a feather or groove, respectively, to thereby create a lock preventing the sliding insert 22 from rotating, as well as a defined position. The sliding insert 22 and the mounting portion 2 are thereby in precise alignment with respect to one another, and have defined positions.

In the form of embodiment as shown in FIG. 3 the mounting portion 2 also comprises a cover cap 28 the apron 41 of which is placed around the sliding insert 22, slightly undergripping the same. The configuration of the bottom end of the apron 41 and of the bottom side of the sliding insert 22 is shown in FIG. 3a where the bottom end of the apron 41 together with the bottom side of the sliding insert 22 forms a labyrinth-type pack 42.

Figure 4:
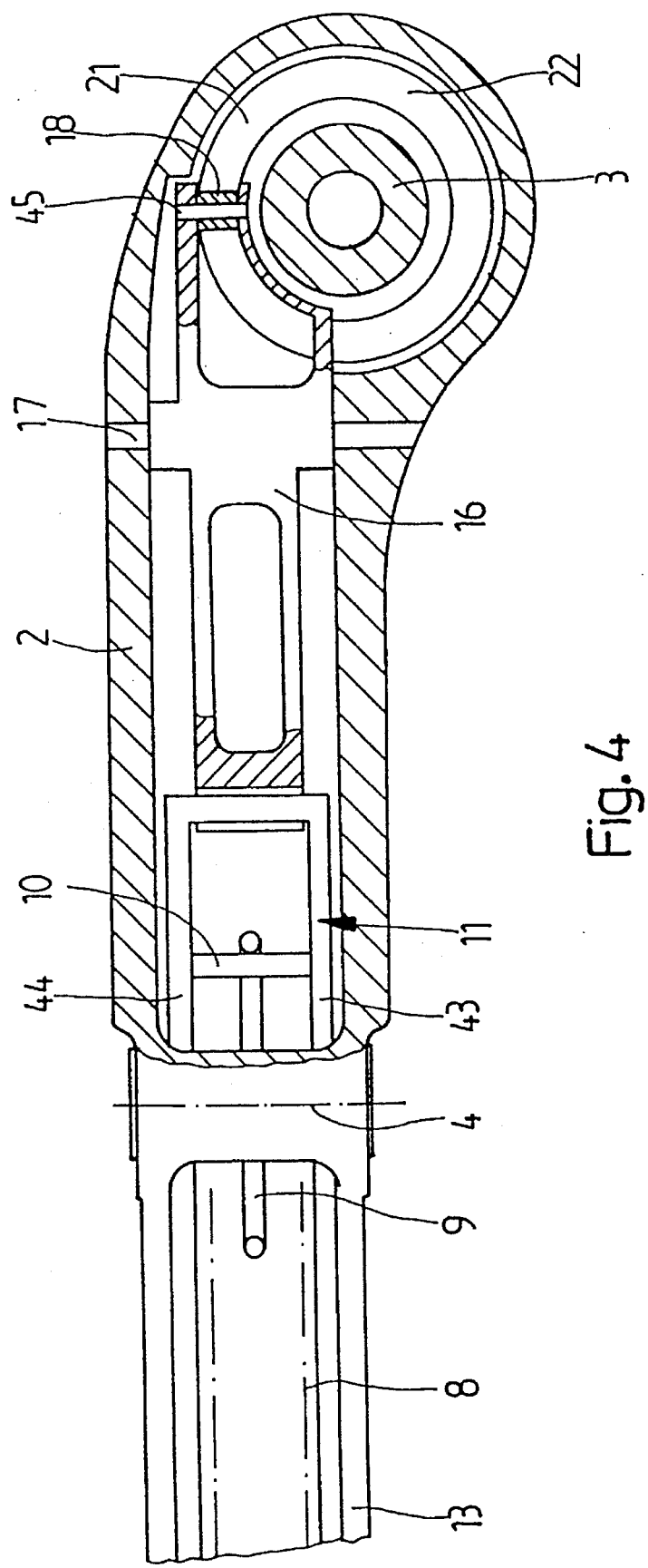
FIG. 4 is a cross-sectional view of the area of the mounting portion secured to the wiper shaft.

FIG. 4 shows an example of embodiment of the mounting portion 2 in cross-section, illustrating, in particular, the set lever 16 and the support lever 11. The support lever 11 is in the form of a dual-leg lever, with the wiper arm spring 8 and the bracket 9 being provided between the two legs 43 and 44 and the bracket 9 being hooked on bearing 10. In this embodiment, the roller bearing 18 is rotatably disposed on a pin 45 arranged essentially in parallel to the swivel bearing 17. Moreover, the pin 45 is so aligned that the axis thereof extends in radial relationship to the wiper shaft 3. Located below the roller bearing 18 is the sliding insert 22 with the cam 21 which, in that form of embodiment, is arranged in the upper righthand-side quadrant of the sliding insert 22.

Figure 5:
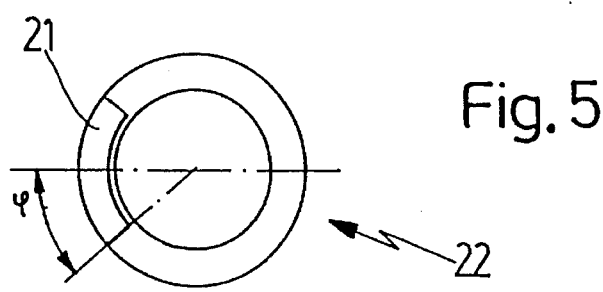
FIG. 5 is a plan view of the sliding insert.

FIG. 5 is a plan view of the sliding insert 22, with the cam 21 extending from the lefthand bottom to the lefthand upper quadrant. The sliding insert 22 is of a substantially cylindrical ring shape, with the cam 21 being axially mounted on a front side, as conveyed by FIG. 6.

Figure 6:
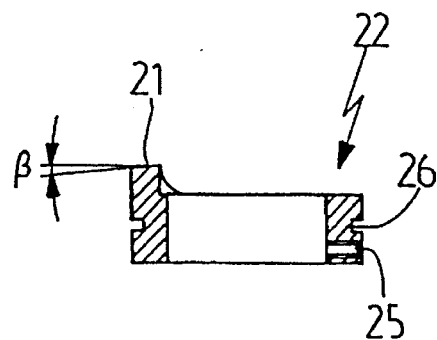
FIG. 6 is a cross-sectional view of the sliding insert according to FIG. 5.
Figure 7:
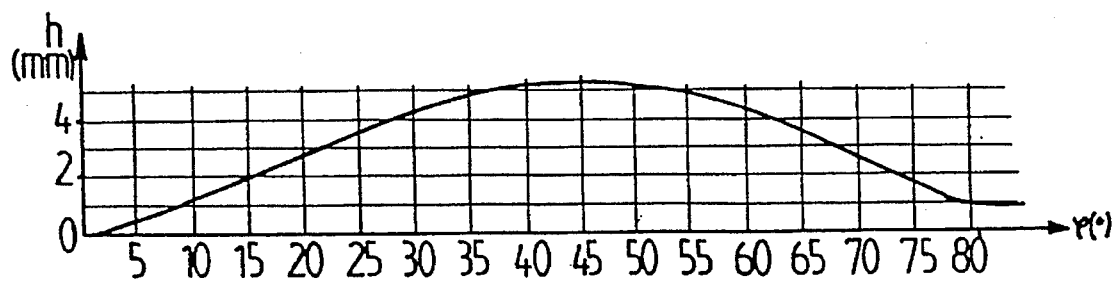
FIG. 7 is a diaphragm showing the projection in the plane of the sliding insert.

The diagram of FIG. 7 illustrates the configuration of the sliding crank, with a maximum elevation of about 3 to 10 mm, preferably 5 mm at half a wiping angle ρ. FIG. 6, in addition, shows that the front face of cam 21 is flattened over the front face of the sliding insert 22 by an angle β so that the roller bearing 18 always rolls on cam 21 along a line. The surface of cam 21 in each position of rotation extends in parallel to the axis of the roller bearing 18 of the set lever 16.

We claim:

1. A windscreen wiper system for wiping a windscreen of an automotive vehicle, said system comprising:

a wiper rod supporting a wiper blade, said wiper rod fixedly supported by a wiper arm, said wiper arm being pivotally connected to a mounting portion, said mounting portion being fixed on a wiper shaft for oscillation therewith, an elongated wiper arm spring, said arm spring having an end proximal to said wiper shaft and an end distal to said wiper shaft, said distal end pivotally coupled with said wiper rod, said wiper arm spring applying a bias force to said wiper blade against a windscreen, with a force of said wiper arm spring forcing said wiper blade onto said windscreen being variable by an adjusting mechanism, wherein said adjusting mechanism includes an elongated support lever, an elongated set lever and an insert, said support lever having an end proximal to said wiper shaft and an end distal to said wiper shaft, said support lever is swivably coupled by said distal end within a bearing on said mounting portion, said proximal end of said wiper arm spring being pivotally attached on said support lever at a point thereof adjacent to said proximal end of said support lever, said set lever having a first end pivotally and slidably engaging said support lever at said proximal end thereof, said set lever having a second end in abutting engagement with a surface of said insert, said set lever is pivotally coupled, intermediate its ends thereof, to said mounting portion, said set lever is swiveled upon actuation of the windscreen wiper system by movement over said insert surface so as to vary a line of operation of said wiper arm spring relative to an axis of said wiper arm such that the bias force the spring applies to the wiper blade is adjusted.

2. The windscreen wiper system according to claim 1, wherein said support lever is formed as a two-leg lever and said wiper arm spring is placed along and between said two legs.

3. The windscreen wiper system according to claim 1, wherein said bearing is of a fork-type configuration.

4. The windscreen wiper system according to claim 1, wherein said wiper arm, said mounting portion, and said insert are formed as an integral unit.

5. The windscreen wiper system according to claim 1, wherein said mounting portion further comprises a cover cap placed around said insert, a part of said cap undergripping said insert forms a labyrinth-type pack with a bottom side of said insert.

6. The windscreen wiper system according to claim 1, wherein said insert s rigidly connected to a bearing of said wiper shaft.

* * * * *